(12) United States Patent
Zhang (10) Patent No.: US 10,407,325 B2
(45) Date of Patent: Sep. 10, 2019

(54) SYSTEMS, COMPOSITIONS AND METHODS FOR PROVIDING SAFE AND HEALTHY WATER AND WATER-BASED PRODUCTS

(71) Applicant: A. O. Smith Corporation, Milwaukee, WI (US)

(72) Inventor: Hai-Feng Zhang, Winchester, MA (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 192 days.

(21) Appl. No.: 15/430,291

(22) Filed: Feb. 10, 2017

(65) Prior Publication Data

US 2017/0152165 A1 Jun. 1, 2017

Related U.S. Application Data

(62) Division of application No. 14/376,358, filed as application No. PCT/US2013/024615 on Feb. 4, 2013, now Pat. No. 9,604,861.

(Continued)

(51) Int. Cl.
*C02F 1/68* (2006.01)
*C02F 1/32* (2006.01)
(Continued)

(52) U.S. Cl.
CPC .............. *C02F 1/687* (2013.01); *B67D 7/766* (2013.01); *C02F 1/008* (2013.01); *C02F 1/32* (2013.01);
(Continued)

(58) Field of Classification Search
CPC ...... B01D 61/02; B01D 61/025; B01D 61/10; B01D 61/12; B01D 2311/06;
(Continued)

(56) References Cited

U.S. PATENT DOCUMENTS 3,375,913 A 4/1968 Norris, Jr.
3,683,177 A 8/1972 Veloz
(Continued)

FOREIGN PATENT DOCUMENTS

CN 1226516 8/1990
CN 1843967 10/2006
(Continued)

OTHER PUBLICATIONS

First Office Action from the State Intellectual Property Office of China dated Jun. 19, 2015 (28 pages).
(Continued)

*Primary Examiner* — Joseph W Drodge
(74) *Attorney, Agent, or Firm* — Michael Best & Friedrich LLP (57) ABSTRACT

A method for providing a safe and healthy water and water-based product, comprising: testing pretreated reverse osmosis water to determine whether it meets a first set of pre-defined specifications; introducing a pre-defined nutrient composition into the water, wherein the predefined nutrient composition comprising one or more of mineral nutrients, trace elements and nutritional supplements; testing the water to determine whether it meets a second set of predefined specifications; and disinfecting the water along with its container by UV irradiation from a UV light source to obtain a water product.

12 Claims, 5 Drawing Sheets

Process flow chart

Related U.S. Application Data (60) Provisional application No. 61/594,064, filed on Feb. 2, 2012.

(51) Int. Cl.

| | | |
|---|---|---|
| *C02F 1/44* | (2006.01) | |
| *B67D 7/76* | (2010.01) | |
| *C02F 1/00* | (2006.01) | |
| *C02F 9/00* | (2006.01) | |
| *C02F 103/04* | (2006.01) | |

(52) U.S. Cl.
CPC .............. *C02F 1/325* (2013.01); *C02F 1/441* (2013.01); *C02F 1/686* (2013.01); *C02F 9/005* (2013.01); *B67D 2210/0001* (2013.01); *B67D 2210/00015* (2013.01); *C02F 1/68* (2013.01); *C02F 2103/04* (2013.01); *C02F 2209/001* (2013.01); *C02F 2209/003* (2013.01); *C02F 2209/05* (2013.01); *C02F 2303/04* (2013.01)

(58) Field of Classification Search
CPC .... B01D 2311/2611; B01D 2311/2619; B01D 2311/2692; B67D 7/76; B67D 7/766; B67D 2210/00005; B67D 2210/0001; B67D 2210/0013; B67D 2210/0015; B67D 2210/00015; B67D 7/78; C02F 1/008; C02F 1/32; C02F 1/325; C02F 1/44; C02F 1/441; C02F 1/68; C02F 1/686; C02F 1/687; C02F 2209/003; C02F 2209/05; C02F 2209/06; C02F 2209/10; C02F 9/005; C02F 2303/04; C02F 2103/04; C02F 2209/001
USPC ....... 210/85, 94, 96.1, 192, 198.1, 201–203, 210/259; 222/189.06, 189.08, 189.11, 23, 222/52; 250/432, 432 R; 422/66
See application file for complete search history.

(56) References Cited

U.S. PATENT DOCUMENTS

| | | | | |
|---|---|---|---|---|
| 4,160,727 A | * | 7/1979 | Harris, Jr. | B01D 61/022 210/140 |
| 4,528,093 A | | 7/1985 | Winer | |
| 4,623,467 A | * | 11/1986 | Hamlin | B01D 61/08 210/257.2 |
| 5,443,739 A | | 8/1995 | Vogel et al. | |
| 5,665,240 A | * | 9/1997 | Hong | C02F 1/5236 210/201 |
| 5,817,231 A | * | 10/1998 | Souza | B01D 61/08 210/96.2 |
| 6,001,244 A | * | 12/1999 | Salter | B01D 65/02 210/104 |
| 6,238,575 B1 | * | 5/2001 | Patil | A01N 25/34 210/167.3 |
| 6,447,721 B1 | * | 9/2002 | Horton, III | A61L 2/10 210/748.11 |
| 7,754,090 B1 | | 7/2010 | Berg | |
| 8,126,589 B1 | | 2/2012 | Parker | |
| 9,604,861 B2 | * | 3/2017 | Zhang | C02F 1/008 |
| 2002/0158018 A1 | | 10/2002 | Abramowitz et al. | |
| 2005/0087500 A1 | * | 4/2005 | D'Emidio | C02F 1/002 210/756 |
| 2007/0125713 A1 | | 6/2007 | Harris | |
| 2008/0314807 A1 | * | 12/2008 | Junghanns | B01D 61/025 210/85 |
| 2009/0050565 A1 | | 2/2009 | Muralidhara et al. | |
| 2009/0134074 A1 | * | 5/2009 | Doran | C02F 9/005 210/85 |
| 2009/0242485 A1 | * | 10/2009 | Cabados | C02F 9/005 210/652 |
| 2009/0255874 A1 | * | 10/2009 | Tenne | B01D 61/025 210/638 |
| 2011/0147194 A1 | | 6/2011 | Kamen et al. | |
| 2011/0257788 A1 | | 10/2011 | Wiemers et al. | |
| 2012/0181238 A1 | * | 7/2012 | Sussman | B01D 61/147 210/790 |
| 2012/0298352 A1 | | 11/2012 | Holderman et al. | |
| 2013/0306561 A1 | * | 11/2013 | Sigona | C02F 9/00 210/652 |

FOREIGN PATENT DOCUMENTS

| | | |
|---|---|---|
| CN | 101744336 | 6/2010 |
| CN | 102079589 | 6/2011 |
| EP | 1876901 B1 | 11/2011 |

OTHER PUBLICATIONS

Second Office Action and Search Report from the State Intellectual Property Office of China for Application No. 201380018519.6 dated Jan. 18, 2016 (16 pages).
International Search Report and Written Opinion for PCT Application No. PCT/US13/24615 dated Apr. 15, 2013 (16 pages).
Wenchuan Ding et al. , "The Microbiological Experimental Technology of Water Treatment," Chemical Industry Press, p. 50-51, dated Jun. 30, 2011(7 pages including Statement of Relevance).
Indian Patent Office Examination Report for Application No. 7075/DELNP/2014 dated Jun. 21, 2018 (5 pages).

* cited by examiner

Central part of the system, including Compositions Holder, UV Source and Shield, Water Dispenser

SYSTEMS, COMPOSITIONS AND METHODS FOR PROVIDING SAFE AND HEALTHY WATER AND WATER-BASED PRODUCTS

RELATED APPLICATIONS

The present application is a continuation of U.S. patent application Ser. No. 14/376,358, filed on Aug. 1, 2014, which is a National Stage of International Patent Application Number PCT/US2013/024615, filed on Feb. 4, 2013, which claims priority to U.S. Provisional Application No. 61/594,064, filed on Feb. 2, 2012 each of which is incorporated herein by reference.

TECHNICAL FIELD OF THE INVENTION

The invention generally relates to provision of drinking water and water-based products. More particularly, the invention relates to systems, compositions and methods that provide water and water-based products that are clean, safe, quality-assured, healthy and/or nutrient-enriched as well as conveniently accessible.

BACKGROUND OF THE INVENTION

Water is essential to the human survival. It accounts for approximately 70% of the human body by mass (excluding fat). Water is an imperative part of human's metabolic and other biological processes. In the U.S., an average American adult ingests about 2.0 liters of water per day. Access to clean and healthy drinking water on a daily basis is not a given in many developing countries. People have inadequate access to clean water and have to routinely consume water that contain unacceptable levels of disease pathogens, toxins, harmful chemical and biological contaminants. Drinking such water can lead to acute and chronic illnesses and remains a major heath risk in many countries. For example, nitrates from fertilizer runoff can pose serious health risks. Roughly half of the world's hospital beds are occupied by patients suffering from waterborne diseases. Even in developed countries, waterborne diseases due to lack of portable or home-based clean water sources can cause public health issues. Another common problem is lead, which can be especially dangerous to the mental and physical development of children.

In addition to having minimal undesirable contaminants, truly healthy and beneficial drinking water should also have certain necessary minerals and trace elements. A number of minerals and trace elements are required to support human biochemical and physiological processes (e.g., by serving structural and functional roles as well as electrolytes). In processes aimed at providing clean and safe drinking water, the resulting water often does not contain the desired levels of mineral nutrients (e.g., calcium, magnesium, potassium, phosphorus, sulfur). Distilled or purified water, for example, may lack the balanced essential minerals found in natural spring water.

There are two conventional approaches to water treatments. One is centralized treatment where water is treated at major plants or establishments and is delivered to consumers by pipes or containers. Another approach is point-of-use (POU)/point-of-entry (POE), where water is treated right before consumption. Each treatment approach has advantages and disadvantages. For the centralized system, usually an inline or off line water quality-monitoring device is installed to make sure to monitor the quality of the production. However, centrally treated water has to be delivered to consumers either by pipes or containers, often made with metallic or plastic materials. These delivery mechanisms can introduce contaminations during transportation process such that even the water was of good quality when produced, the consumer drinks water that is no longer safe and healthy, for example, due to contaminations by heavy metals or microbiological pathogens that are often detected in tap water and bottle water.

Certain disinfectants like ozone or chlorine based chemicals are often added to the treated water to preserve the water from microbiological contaminant. These disinfectants, if properly used in minimal quantities can generally be considered as safe, may affect a consumer's health with extended long-term consumption and accumulation.

POU/POE is more advantageous in providing drinking water to the public. In the POU/POE approach, water is treated right before consumption, which minimizes the chance of re-contamination of water after it is treated. However, except with a reverse osmosis (RO) system, it is very difficult to provide inline or off line water test for the individual consumer due to the high cost. Therefore, the end user really cannot know whether the water is safe and healthy at the point of consumption. POU/POE devices (e.g., pitchers, faucet-mounting devices, and bench top or under the sink systems) are quite popular with the public now. The customer, however, can only assume that the filtration/purification systems in these devices can achieve what is claimed by the manufacture. Unfortunately, many products do not consistently provide quality drinking water as claimed, which makes POU/POE without water quality monitoring/alerting device not the best choice for customers.

Therefore, there is a continued need for novel systems and methods that provide clean, safe, healthy and disinfectant free drinking water to the individual consumer with quality assurance.

SUMMARY OF THE INVENTION

The invention relates to systems, compositions and methods that provide high quality drinking water and water-based products that are clean, safe, quality-assured, healthy and disinfectant free and/or nutrient-enriched as well as being conveniently accessible. Methods and systems of the invention enable reliable and instant dispensing of safe and healthy water with predefined characteristics. Systems/devices of the invention can be integrated with a RO filtration system/component so that the input water can be varied.

In one aspect, this invention generally relates to a method for providing a water product for human consumption. The method includes: testing pretreated reverse osmosis water to determine whether it meets a first set of pre-defined specifications; introducing a nutrient composition into the water, wherein the nutrient composition includes one or more of mineral nutrients, trace elements and nutritional supplements; dispensing the water and nutrient composition into a container; testing the water to determine whether it meets a second set of pre-defined specifications; disinfecting the water in and along with its container by UV irradiation from a UV light source to obtain a water product; and removing the container containing the water product from the UV light source. In certain preferred embodiments, the pre-defined specifications include electrical conductivity, TDS, and/or pH.

In another aspect, the invention generally relates to a method for providing a water product for human consumption. The method includes: providing a plurality of sealed packages of nutrient compositions, each sealed package including a different nutrient composition combination; selecting a sealed package from the plurality of sealed packages depending on a desired nutrient composition for water to be consumed; placing the selected sealed package of nutrient compositions into a holder; piercing the sealed package in the holder; transferring pretreated water to the selected sealed package in the holder to form a solution that includes the pretreated water and the nutrient compositions from the selected sealed package; dispensing the solution into a container for consumption.

DETAILED DESCRIPTION

The invention provides unique systems, compositions and methods that provide high-quality drinking water and water-based products that are clean, safe, quality-assured, healthy, disinfectant free and/or nutrient-enriched as well as being conveniently accessible. In particular, methods and systems of the invention reliably and instantly dispense, safe and healthy water and water-based products with predefined characteristics. Systems/devices of the invention may be integrated or combined with a RO filtration system/component.

The invention enables the consumer to be in charge of quality assurance for his own drinking water. This invention also allows the consumer to customize the water characteristics using pre-prepared, safe and beneficial nutrients and supplements.

Theoretically, a high-quality RO system is capable of removing almost all the contaminants from water. Water produced by this way usually has minimum contaminants, and is often called "pure water". One can test if a system works by measuring the conductivity of the treated water using simple and inexpensive electric conductivity measurements. The Total Dissolved Solids (TDS) meter is designed by using this mechanism. However, such water is often called "dead water" because it has almost nothing in it. Of course, microbiological contaminants can find their way into such water during production, transportation or storage. Continuously drink "dead water" for long periods of time is not good to the consumer's health due to the deficient or imbalanced mineral nutrients and trace elements required by human biology. Some manufacturers attempt to add certain minerals in the water, but such measures are often either ineffective or insufficient or could potentially introduce some unhealthy contaminants in the treated water.

Major differences between the RO "pure" (and "dead") water and healthy drinking water is the mineral nutrients, trace elements and other supplements needed by the humans as well as the related physical and chemical properties of the water. By adding a defined amount of mineral nutrients and trace elements into "pure" water (and enriching it with other supplements), the "pure/dead" water can be activated and transformed into safe and healthy water. Prior to and after introduction of these compositions, the water can be measured with a conductivity measurement device to monitor the characteristics of the water. The water may be disinfected, for example, by an ultraviolet irradiation from a UV source (such as a lamp) to eliminate potential microbiological or other organic contaminants/residues in the water and the container.

Thus, as disclosed herein, through multiple-steps of monitoring-treatment monitoring (e.g., quality-assurance measurements and alert, disincentive and nutritional treatments), methods and systems of the invention consistently provide clean, safe, healthy, and disinfectant free drinking water and water-based products that is free from physical, chemical and biological contaminants. A unique feature of the invention is the capability of the systems of the invention to readily introduce balanced mineral nutrients and other beneficial compositions to water that is customized to the specific needs of the consumer as opposed to the one-size-fits-all approach of conventional approaches. The mineral nutrients, trace elements and other supplements can be formulated to easily dissolve (and/or a mixing step/mechanism may be included to accelerate the solvation process). The invention can be applied to dispensing instant water/other liquid based healthy solution/suspension with predetermined characteristics.

The mineral nutrients, trace elements and other beneficial ingredients may be in the form of concentrated solutions, suspensions, dry powders, pellets and capsules and packaged such that they can readily introduced into water in a customized and instant manner meeting the needs of the consumer.

For the mineral and trace elements, they may be obtained from any safe and suitable sources. They can be extracted (from plants or minerals) and purified from nature or chemically prepared. The obtained minerals and trace elements can be made into concentrated solutions, suspensions, dry powders, pellets and capsules. Concentrated solution is usually obtained initially during an extraction process and can be used as well. However, the dry powder and pellet or capsule type of composition might be the better choices and they can be preserved within a sealed container at certain protection.

Another unique feature of the invention is it enables the consumer to control the characteristics and know the quality of the drinking water. This represents a significant shift from the conventional approach and provides the consumer an easy way to ascertain the water he consumes is clean, safe, healthy and disinfectant free.

The systems, methods and devices of the invention can be used for dispensing any water or other liquid-based nutritious solutions or suspensions. The characteristics of the drink are measured in the course of preparation and dispensing, and the quality of the drink can be under monitor or control every step so as to achieve a well-defined healthy and disinfectant free product.

In some embodiments of the invention, TiO2 nanoparticle-based catalytic component is employed in the system. TiO2 nanoparticles on the catalytic component can be excited by the UV source to catalyze and remove pharmaceutical residuals or harmful organics potentially found in RO treated water.

The invention describes a method. By following this invented method, a device can be built to dispense safe and healthy drinking water instantly. The method is comprised of a number of steps. At each step, a necessary measurement will be conducted to make sure the tested water meets the prescribed standard, and hence the final dispensed water can not only meet the drinking water standard, and also it is beneficial to the consumer's health. The criteria of each step are predetermined and adjustable (for example, to satisfy specific standards or consumer needs). The systems/devices can be operated manually, so that user can conduct the individual test at each step to make sure the characteristics of the water is what they should be.

The system/method of the invention may further include a cleaning step when it is not in use. The cleaning step can be achieved manually or automatically.

The figures, FIG. 1 to FIG. 4, show schematic flow charts and drawings that illustrate exemplary embodiments of the methods and systems of the invention. The flow charts and schematic drawings disclose how the process works and how each step is executed by measuring the characteristics of water, adding the nutrient compositions (when needed) and performing UV disinfection by UV irradiation, and alerting at each step if anything is wrong with the water characteristics as well as alerting the consumer the water is ready for drinking with light/acoustic alarm when all the steps are successfully completed.

Figure 1:
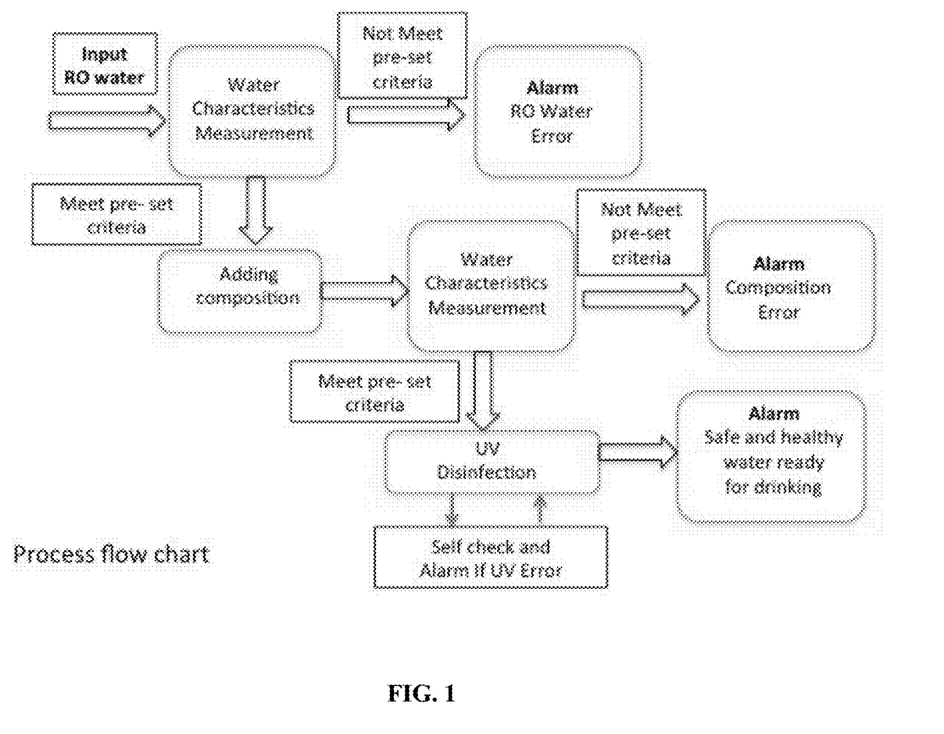
FIG. 1 depicts a flow chart that schematically illustrates an embodiment of the invention with the step of adding compositions.

FIG. 1 depicts a flow chart illustrating an exemplary system according to the invention. In FIG. 1, the flow chart shows how the process works when additional compositions are added into the water. First of all, the characteristics of the water from the RO system is measured to check if it meets a first set of predetermined specifications. If it doesn't meet the predetermined specifications, the alarm is lit or set of to alert the consumer that the RO water system has an error. The RO system is required to be checked before the process continues. If the water does meet the first set of predetermined specifications, then the process moves on to the next step: adding nutrient composition(s). When the compositions are added into the water, the characteristics of the water is measured again to see if it meets a second set of predetermined specifications. If it doesn't, the alarm is lit or set of to alert the consumer that the compositions added into the water is not correct. The consumer is required/asked to correct the error and re-start the process. If the water does meet the specifications, the process moves on to the next step. The UV source is lit and UV light irradiates the water and container to disinfect them for specified period of time (e.g., from about 1 sec to about 10 minutes). When all these process steps are successfully performed, a light/acoustic signal is produced to alert the consumer that the water is now clean, safe, healthy, disinfectant free and ready for consumption.

Figure 2:
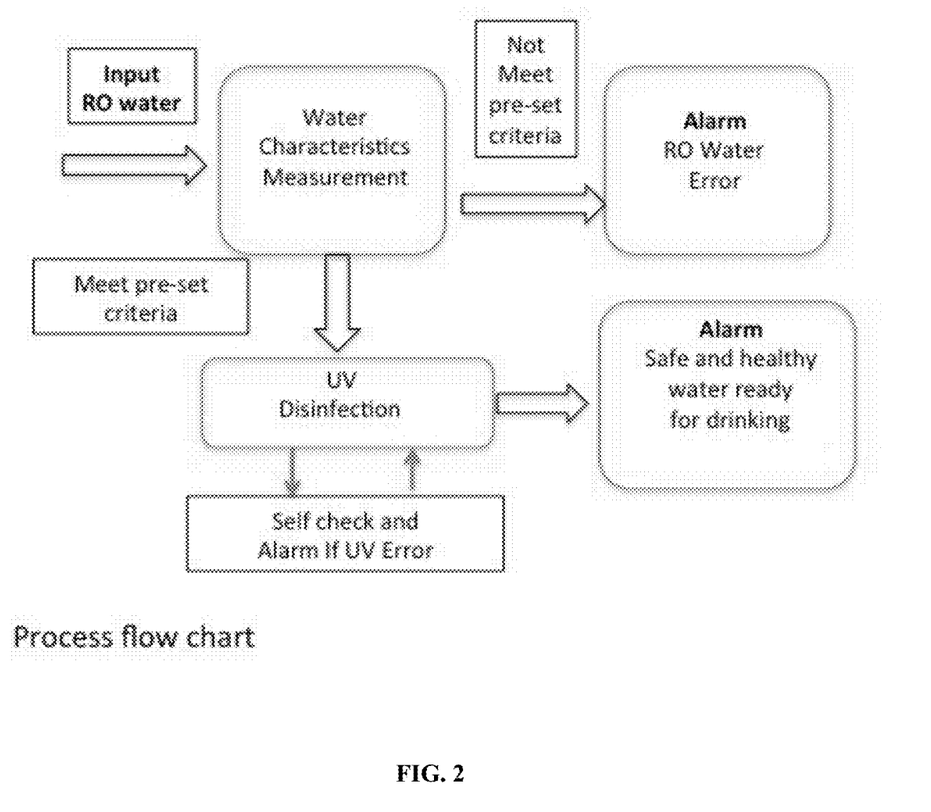
FIG. 2 depicts a flow chart that schematically illustrates an embodiment of the invention without the step of adding compositions.

In FIG. 2, the flowchart shows how the invented process works without additional compositions are added into the water. First of all, the characteristics of the water from the RO system is measured to see if it meets the first set of predetermined specifications. If it doesn't, the alarm is lit or set of to alert the consumer that the RO water system has an error. The RO system is required to be checked before the process continues. If the water does meet the first set of specifications, then the process moves on to the next step. The UV source is switched on and UV light irradiates the water to disinfect the water and the container for a specified period of time (e.g., no less than 1 sec and no longer than 10 minutes). When all these process steps are successfully completed, a light/acoustic signal is provided to alert the consumer that the water is now clean, safe, disinfectant free and ready to drink. In this configuration, no additional compositions are added, and the water is clean, safe and disinfectant free, but not healthy.

Figure 3A:
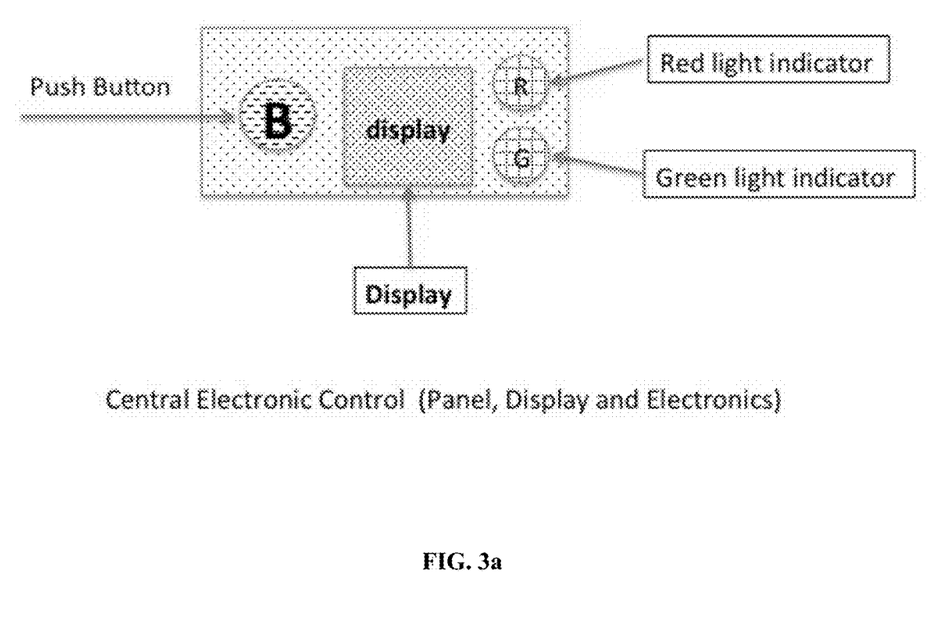
FIGS. 3(a) and (b) show schematic drawings of an exemplary system with individual functional components.

FIG. 3 shows a schematic drawing of an exemplary system (with individual functional components). FIG. 3(a) shows the central electronic control unit, including a control panel, display and electronics). "B" is the push button for starting the process and resetting the program. The Display is for showing messages (e.g., error or ready to drink). R and G are two lights indicating right or wrong when running the process. A speaker is included to alert the alarm with acoustic signal. The central electronic control unit sends signals for measurements, receives data from the probes, sends signals for operating pumps to transfer water, switches on and off the UV lights, and sends signal to light up (e.g., red light and green light) and also displays messages to consumers. The system can be reset by itself when it is not in use for a predetermined period of time.

Figure 3B:
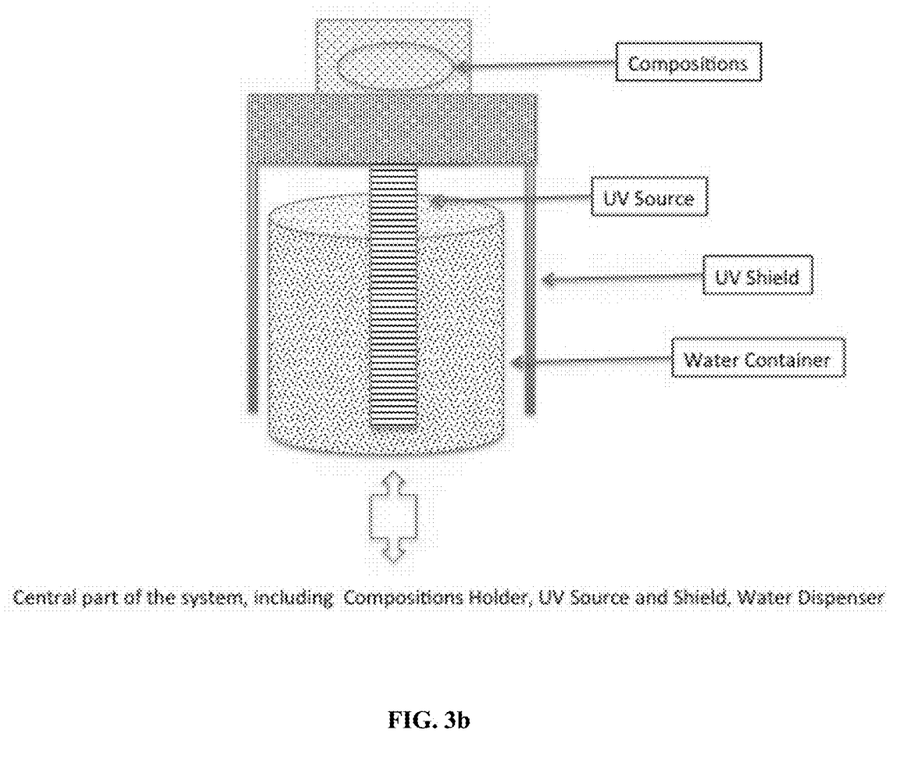

FIG. 3(b) illustrates the central part of the mechanical device, which has a holder for nutrient compositions, a UV source and a UV light shield, and a water dispenser. Nutrient compositions are kept in the holder. Nutrient compositions transferring, water transferring, UV light switching and water measurements are all controlled by the central electronic control unit. If the system is directly connected to the storage tank of the RO system, there is no need for a separated tank for this system. However, if there is no storage tank on the RO system and flow rate of the RO system is high enough, a separate storage tank may be required for this system. The characteristics of the water are measured in the storage tank or from the inlet tube. And the water in this storage tank is transferred to the compositions and the water container (e.g., cup).

Figure 4:
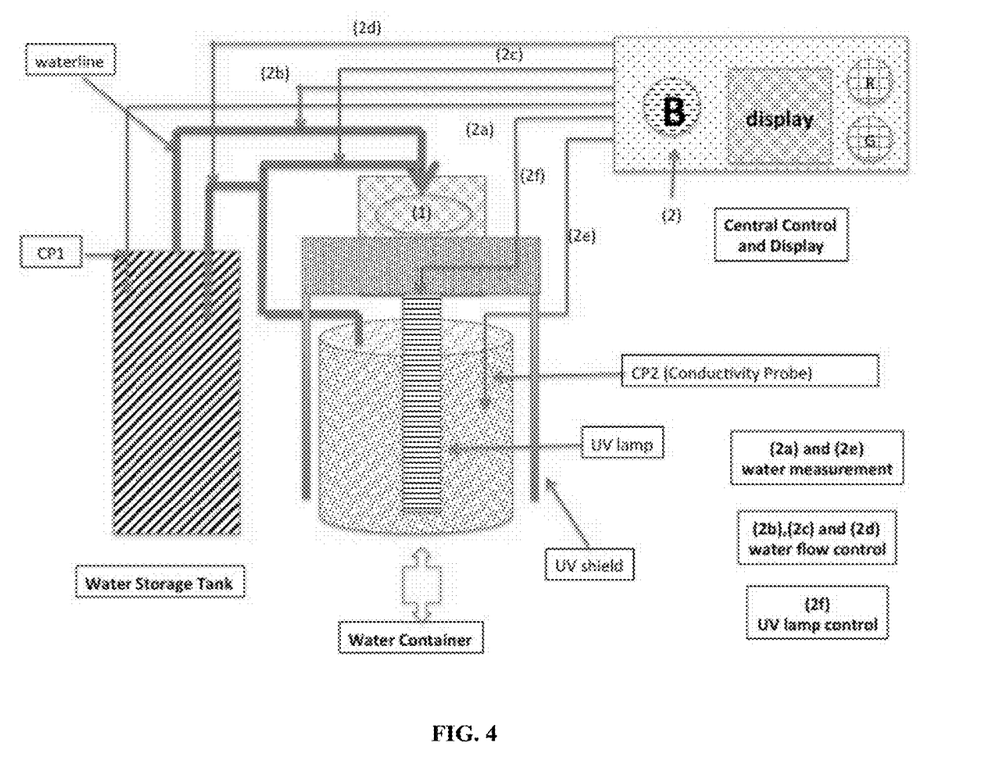
FIG. 4 depicts a schematic drawing of an exemplary system according to the invention.

FIG. 4 depicts a schematic drawing of an exemplary system according to the invention. The consumer places a water container (cup) at the designated spot and puts a sealed package of compositions in the holder for nutrient compositions. The consumer presses the "B" button to start the process, and the cup automatically rises to the collect position within the UV light shield. The central electronic control unit then sends signal (2a) to the first conductivity probe to measure the conductivity of the inlet RO water and compare the conductivity with the first predetermined conductivity value. If the value is higher than the specifications, the alert window shows an error message and the red light is turned on with an acoustic sound to alarm the consumer that the RO water has a problem and the RO system is required to be checked. If the measured value is lower than the specifications, the process moves to the next step. The system transfers water to the container (2b) (nutrient compositions) and then transfers the composition water solution/suspension (2c) to the water container. Flushes the composition sealer package more times to fully transferring the compositions to the water container. Adding more water (2d) to the container (cup) up to the desired pre-determined volume of water. (When a nutrient composition is not readily dissolved, another step is added to make compositions dissolve.) The central electronic control unit starts to measure the conductivity (2e) of the water again when the water reaches the desired volume. If the measured value deviates too much from the second predetermined conductivity specifications, the alert window shows an error message and the red light is turned on with an acoustic sound to alarm the consumer that addition of the compositions is not correct and the process is required to be re-done. If the measured value is within the specifications, the process continues to the next step. The central electronic control unit then switches on the UV source (2f) to irradiate the water and the water container to destroy/remove microbiological contaminants as well as organic contents. When the UV light stays on for a specified length of time (long enough for the disinfection), the central electronic control unit then switches off the UV source and signals that the water is ready for drink (e.g., by lighting up a green light with acoustic alarm. The display also shows a message indicating that water is ready.

The input water is preferably high quality RO water generated from an RO water treatment system. Measurements of conductivity and TDS values are correlated and compared to the predetermined values (e.g., less than about 0.1 ppm, 1.0 ppm, 5.0 ppm, 10 ppm, 20 ppm, 30 ppm, 40 ppm, or 50 ppm, for example) to minimize the presence of contaminants in the RO water. If the value is higher than the predetermined TDS value, the system will alert the consumer that the RO water does not meet the predetermined specific standards. If the measured value is lower than the predetermined value, the process will continue to the next step.

Because of the predetermined quantity of water and predetermined nutrient compositions, the conductivity and TDS levels in the water should be within a predetermined small range of variation from the target values. Another measurement step is performed after the introduction of the nutrient compositions. If the conductivity value is not within the predetermined range, the device will alert consumer that the introduction of the composition is not correct, and the consumer is required to re-start the process. If the value is within the range, the system will continue to the next step of the device. The pre-determined range can be as low as 1 ppm or as high as 100 ppm depending on the quality requirement.

The invention also includes a step that employs a UV source to disinfect both water and the container the water is in. This is to make sure that the water is substantially free of microbiological contaminants and within the relevant standards issued by government agencies. The UV source (e.g., a UV lamp) is lit up for a predetermined time so that microbiological contaminants can be effectively eliminated. The lighting time can be as short as a few seconds up to several minutes. The UV disinfection may be performed prior to or post addition of the nutrient composition (e.g., UV disinfection conducted prior to the addition of the composition when organic nutrition supplements are present).

In some embodiments, a $TiO_2$ nanoparticle catalytic coated component is included in the UV disinfection step. The $TiO_2$ nanoparticles can be excited by the UV source to destroy/remove the harmful pharmaceutical residuals and/or organics.

The nutrient compositions used in this invention (e.g., mineral nutrients, trace elements required and other beneficial supplements) may be provided in the form of concentrated liquid solutions, suspensions, dry powders, pellets or capsules. The amounts/concentrations of the components are pre-determined accordingly to current standards, e.g. those set by the World Health Organization or to the national government agencies. Where a customer has a need for special recipes for his water, the customized composition can be made accordingly.

In some preferred embodiments, the compositions include: $Ca^{2+}$, $HCO_{3-}$, $Mg^{2+}$, $NO_3^{2-}$, $K^+$, $Na^+$, $NO_3^-$, $SO_4^{2-}$, and other elements such as B (boron), Cu, I, Fe, Mn, Se, Zn and Si. The ingredients are preferably extracted from green plants, which sources are generally preferred than other sources, such as synthetic chemicals (which may optionally be used where suitable). An alternate approach is to extract from rocks or stones with enriched minerals and trace elements from natural resources.

Generally speaking, dry compositions such as powders, pellets or capsules are preferred over solution or suspension forms that have higher tendency for re-contamination. The quantity of the powders, pellets and capsules are predetermined for and correspond to certain unit amounts of water, for example, a cup of water, or a unit of 250 mL, 500 mL, 1 L or other define small volume or weight. The preset packages eliminate the risk of deviation from the drinking water standards.

Thus, in one aspect, the invention generally relates to a method for providing a clean, safe, healthy and disinfectant free water and water-based product. The method includes: testing pretreated reverse osmosis water to determine whether it meets a first set of predefined specifications; introducing a pre-defined nutrient composition into the water, wherein the pre-defined nutrient composition comprising one or more of mineral nutrients, trace elements and nutritional supplements; testing the water to determine whether it meets a second set of pre-defined specifications; and disinfecting the water along with its container by UV irradiation from a UV light source to obtain a water and water-based product.

In certain preferred embodiments, the pre-defined specifications include electrical conductivity, TDS, and/or pH.

In certain preferred embodiments, disinfecting the water includes irradiation with UV light for a period from about 1 second to 10 minutes (e.g., 2 seconds, 5 seconds, 10 seconds, 30 seconds, 1 min., 5 min., 10 min.).

Exemplary mineral nutrients that may be added to the water products of the invention include $Ca^{2+}$, $HCO_{3-}$, $Mg^{2+}$, $NO_3^{2-}$, $K^+$, $Na^+$, $NO_3^-$, $SO_4^{2-}$. Exemplary trace elements that may be added to the water products of the invention include B (boron), Cu, I, Fe, Mn, Se, and Zn. Exemplary nutritional supplements that may be added to the water products of the invention include various vitamins, for example, Vitamin B and C.

In certain preferred embodiments, the water and water-based products dispensed by the systems of the invention has less than 100 CPU of total microorganisms. Exemplary specifications are provided in Table 1 below. In drinking water, the contaminants listed in Table I should be as little as possible. The most preferred is when none of them exist in the dispensed water.

TABLE 1

Exemplary Core Specifications

| Contaminants | Drinking Water Standards |
| --- | --- |
| Microbiological: | |
| Total bacteria | < 100 counts/mL |
| Total *E. Coli* | 0 count/L |
| Metal ions: | |
| Hg | <0.001 mg/L |
| Al | <0.30 mg/L |
| Pb | <0.01 mg/L |
| As | <0.010 mg/L |
| Organics: | |
| $CN^-$ | <0.05 mg/L |
| $CH_3Cl$ | <0.06 mg/L |
| $CCL_4$ | <0.002 mg/L |
| Turbidity | <1 NTU |

Table 2 lists exemplary additional specifications. These minerals are necessary for the health of humans. On one hand, their concentrations are required to be kept low enough to meet the drinking water standards (except special requirement for special consumers). On the other hand, the minerals are preferred to be present in certain amounts as they are needed in by the human body.

TABLE 2

Exemplary Additional Specifications

| Contaminants | Drinking Water Standards |
|---|---|
| F | <1.0 mg/L |
| NO3(−) | <20 mg/L |
| Metal ions: | |
| Se | <0.01 mg/L |
| Zn | <1.0 mg/L |
| Cu | <1.0 mg/L |
| Mn | <0.1 mg/L |
| Fe | <0.3 mg/L |

In certain preferred embodiments, the one or more of mineral nutrients, trace elements and nutritional supplements are in the form of solution prior to addition to the water. In certain preferred embodiments, the one or more of mineral nutrients, trace elements and nutritional supplements are in the form of suspension prior to addition to the water. In certain preferred embodiments, the one or more of mineral nutrients, trace elements and nutritional supplements are in the form of dry powder prior to addition to the water. In certain preferred embodiments, the one or more of mineral nutrients, trace elements and nutritional supplements are in the form of pellets prior to addition to the water. In certain preferred embodiments, the one or more of mineral nutrients, trace elements and nutritional supplements are in the form of capsules prior to addition to the water.

In another aspect, the invention generally relates to a system for dispensing clean, safe, healthy and disinfectant free water and water-based products. The system includes: an inlet (optionally with a reservoir) for receiving pretreated water; an analytical unit comprising one or more probes and an circuit system for receiving and processing electrical signal from the one or more probes; an alert component comprising a light and/or acoustic alarm; a UV light source; a holder for keeping a nutrient composition for addition to the water being processed; and an outlet for dispensing post-treatment water for consumption.

In certain preferred embodiments, the system is capable of dispensing about 10 mL to about 5 L of water per use (e.g., 100 mL, 250 mL, 500 mL, 1.0 L, 2.0 L, 5.0 L).

In certain preferred embodiments, the pre-treatment water is provided by a RO system.

Systems, methods and compositions disclosed herein may be applied to or adopted for all suitable applications for preparation of water-based or liquid-based drinks and products. The quality control can be applied in every single step to ensure that the final product meets the required standards.

The systems may be designed such that they are manually controlled, fully automated or partially automated. To ensure that the system works under the most precise and best, a fully automated system has certain advantages over manually controlled systems.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A method for providing a water product for human consumption, the method comprising:
    testing pretreated reverse osmosis water to determine whether it meets a first set of pre-defined specifications;
    introducing a nutrient composition into the tested pretreated reverse osmosis water, wherein the nutrient composition includes one or more of mineral nutrients, trace elements and nutritional supplements;
    dispensing the water having the introduced nutrient composition into a container;
    testing the dispensed water to determine whether it meets a second set of pre-defined specifications;
    disinfecting the tested water in and along with its container by UV irradiation from a UV light source to obtain a water product; and
    removing the container containing the disinfected water from the UV light source for consumption.

2. The method of claim 1, wherein testing the water before or after dispensing includes testing the water to determine whether the water meets pre-defined specifications with respect to electrical conductivity or TDS or pH.

3. The method of claim 1, wherein disinfecting the tested water comprises irradiation with UV light for a period from about 1 second to 10 minutes.

4. The method of claim 1, wherein introducing a nutrient composition includes introducing mineral nutrients selected from ions comprising: $Ca^{2+}$, $HCO_{3-}$, $Mg^{2+}$, $NO_3^{2-}$, $K^+$, $Na^+$, $NO_3^-$, $SO_4^{2-}$.

5. The method of claim 1, wherein introducing a nutrient composition includes introducing trace elements selected from elements comprising: B, Cu, I, Fe, Mn, Se, and Zn.

6. The method of claim 1, wherein introducing a nutrient composition includes introducing vitamins.

7. The method of claim 1, wherein introducing a nutrient composition includes introducing the nutrient composition in a sealed package.

8. The method of claim 7, wherein dispensing the water and nutrient composition includes dispensing 10 mL to 5.0 L of water having nutrient compositions added from a sealed package.

9. The method of claim 1, wherein disinfecting the tested water in and along with its container includes obtaining a water product comprising less than 1 count/L of *E. Coli*.

10. The method of claim 1, wherein the first set of pre-defined specifications comprises one or more of a less than 0.001 mg/L of Hg, less than 0.01 mg/L of Pb, or less than 0.060 mg/L of $CH_3Cl$.

11. The method of claim 1, wherein disinfecting the tested water in and along with its container includes obtaining a water product that is substantially free of chemical disinfectants.

12. The method of claim 1, wherein introducing a nutrient composition into the water comprises introducing the nutrient compositions in the form of solution, suspension, dry powder, pellets, or capsules.

* * * * *